(12) United States Patent
Wiley et al.

(10) Patent No.: US 7,058,844 B2
(45) Date of Patent: Jun. 6, 2006

(54) SYSTEM AND METHOD FOR RAPID FAULT ISOLATION IN A STORAGE AREA NETWORK

(75) Inventors: Stephen A. Wiley, Arvada, CO (US); Wayne Munson, Louisville, CO (US); Christian Cadieux, Louisville, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 698 days.

(21) Appl. No.: 10/172,303

(22) Filed: Jun. 13, 2002

(65) Prior Publication Data

US 2002/0194524 A1 Dec. 19, 2002

Related U.S. Application Data

(60) Provisional application No. 60/298,658, filed on Jun. 15, 2001.

(51) Int. Cl.
*G06F 11/00* (2006.01)
*G01R 31/28* (2006.01)

(52) U.S. Cl. .......................................... 714/4; 714/704
(58) Field of Classification Search ...................... 714/4, 714/18, 39, 43, 47, 48, 56, 704, 712, 717, 714/764

See application file for complete search history.

(56) References Cited

U.S. PATENT DOCUMENTS 4,500,985 A * 2/1985 Chang ........................ 370/244
5,239,537 A 8/1993 Sakauchi ..................... 370/16

(Continued)

FOREIGN PATENT DOCUMENTS

JP 1156778 6/2001

OTHER PUBLICATIONS

"*Diagnostics Validation & Verification*," pp. 1–12 [online] [retrieved on Sep. 25, 2003] Retrieved from http://www.giordano.com/Help/Sect8.htm.
Qualtech Systems, Inc. "*Diagnostic Modeling of a Data Bus System TEAMS 4.0*," by SOMNATH DEB, pp. 1–13 [online] Retrieved from http://www.teamqsi.com/doc/1553–report.pdf.
U.S. Appl. No. 10/389,642 filed on Mar. 13, 2003, entitled "Method, System, and Article of Manufacture for Fault Determination" by G. G. Gibson; T. H. McKenney; C. Cadieux and P.C. Kiser.
U.S. Appl. No. 10/172,302, filed on Jun. 13, 2002, entitled "System and Method for Isolating Faults in a Network", invented by S.A. Wiley, D.A. Schell, and C. Cadieux.

*Primary Examiner*—Nadeem Iqbal
(74) *Attorney, Agent, or Firm*—Meyertons Hood Kivlin Kowert & Goetzel, P.C.

(57) ABSTRACT

A fault region identification system adapted for use in a network, such as a storage area network (SAN), includes logic and/or program modules configured to identify errors that occur in the transmission of command, data and response packets between at least one host, switches and target devices on the network. The system maintains a count at each of a plurality of packet-receiving components of the network, the count indicating a number of CRC or other errors that have been detected by each component. The error counts are stored with the time of detection. The system alters the EOF (end-of-file) delimiter for each packet for which an error was counted such that other components ignore that packet, i.e. do not increment their error counts for that packet. Link segments adjacent single- or multiple-device components of the network are identified as fault regions, based upon the error counts of those components.

21 Claims, 4 Drawing Sheets

U.S. PATENT DOCUMENTS

| | | | |
|---|---|---|---|
| 5,303,302 A | * | 4/1994 | Burrows ................... 713/161 |
| 5,333,301 A | * | 7/1994 | Cheney et al. ............... 714/56 |
| 5,390,188 A | * | 2/1995 | Dawson ..................... 714/717 |
| 5,396,495 A | * | 3/1995 | Moorwood et al. ......... 370/408 |
| 5,448,722 A | | 9/1995 | Lynne et al. |
| 5,519,830 A | | 5/1996 | Opoczynski ........... 395/182.02 |
| 5,574,856 A | | 11/1996 | Morgan et al. |
| 5,636,203 A | | 6/1997 | Shah .......................... 370/244 |
| 5,664,093 A | | 9/1997 | Barnett et al. |
| 6,006,016 A | | 12/1999 | Faigon et al. |
| 6,016,510 A | | 1/2000 | Quattromani et al. ....... 709/233 |
| 6,249,887 B1 | | 6/2001 | Gray et al. |
| 6,324,659 B1 | | 11/2001 | Pierro |
| 6,353,902 B1 | | 3/2002 | Kulatunge et al. |
| 6,414,595 B1 | | 7/2002 | Scrandis et al. |
| 6,442,694 B1 | | 8/2002 | Bergman et al. |
| 6,460,070 B1 | | 10/2002 | Turek et al. |
| 6,499,117 B1 | | 12/2002 | Tanaka |
| 6,556,540 B1 | * | 4/2003 | Mawhinney et al. ........ 370/229 |
| 6,587,960 B1 | | 7/2003 | Barford et al. |
| 6,609,167 B1 | * | 8/2003 | Bastiani et al. ............. 710/104 |
| 6,675,346 B1 | * | 1/2004 | Tsunoda ..................... 714/774 |
| 2002/0144193 A1 | | 10/2002 | Hicks et al. |
| 2002/0194524 A1 | | 12/2002 | Wiley et al. |
| 2003/0074471 A1 | | 4/2003 | Anderson et al |

* cited by examiner .

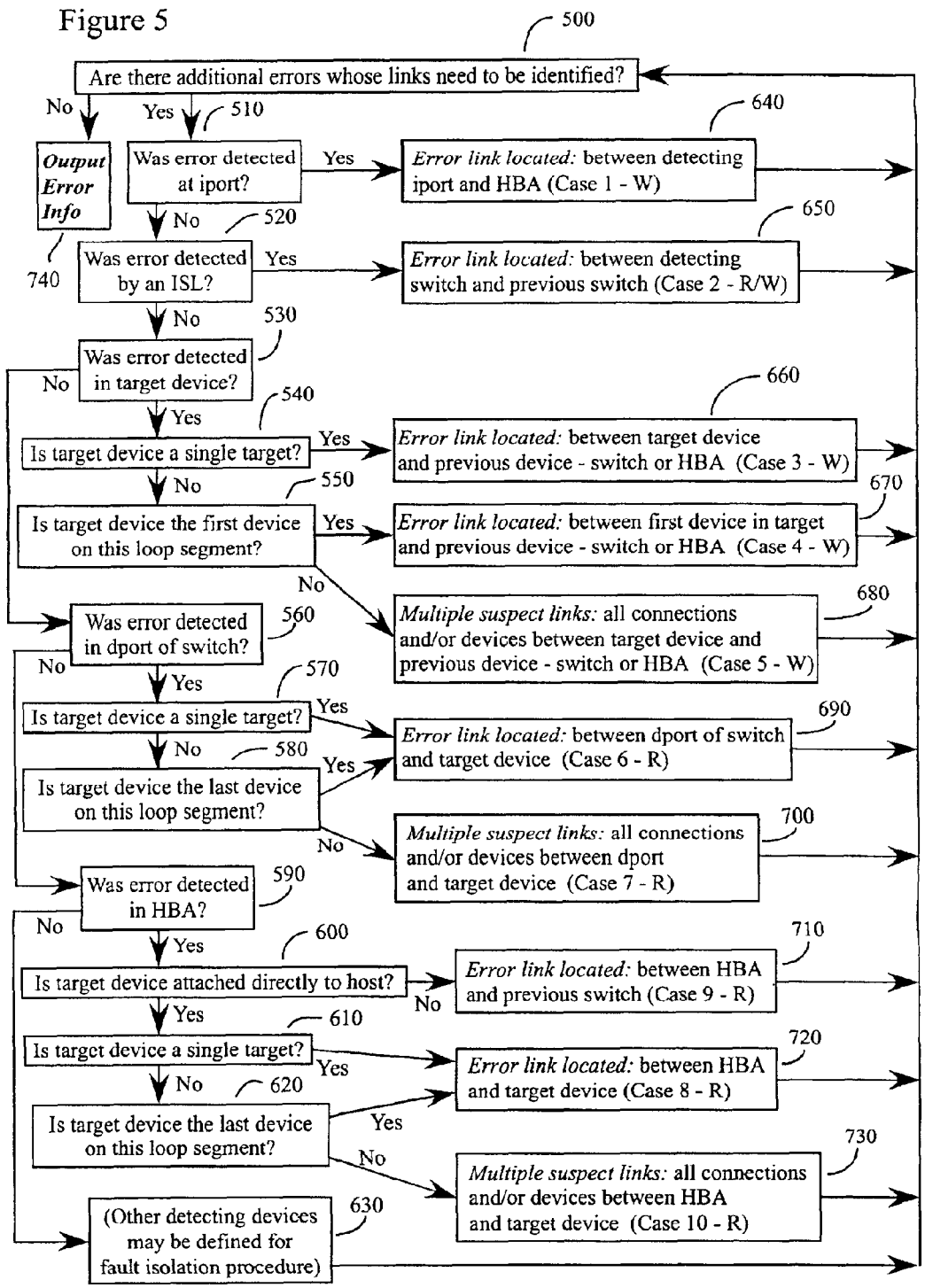

SYSTEM AND METHOD FOR RAPID FAULT ISOLATION IN A STORAGE AREA NETWORK

This application claims the priority of the Provisional Patent Application Ser. No. 60/298,658 filed Jun. 15, 2001, which is incorporated herein by reference.

BACKGROUND OF THE INVENTION

The present invention relates to a system and method for rapidly identifying the source regions for errors that may occur in a storage area network (SAN). Such isolation of faults or errors presents a challenge to network administration, particularly in networks that may include hundreds or even thousands of devices, and may have extremely long links (up to 10 kilometers) between devices.

In systems currently in use, when a link in a network fails or when a device causes an error, it is conventional to try to reproduce the event, such as a read or write command, that caused the error. There is a substantial amount of trial and error involved in trying to isolate fault regions in this way, which is very expensive in time and resources, especially when a large number of components is involved.

As SANs become larger and longer, especially with the use of very long fibre optic cables, it becomes more urgent that a fast and deterministic method and system be developed so that isolating errors that occur in these larger systems does not become prohibitively expensive or time-consuming.

It is particularly desirable that such a system be provided that scales efficiently as a network increases in size, preferably with minimal alteration to the fault isolation system or the network itself.

SUMMARY OF THE INVENTION

The present invention allows deterministic isolation of faults in a network, such as a fibre channel (FC) network, by determining which of a plurality of predefined cases applies to each detected error. Each error, including CRC errors, is identified and logged as applying to a specific receiver module in a component of the network. By determining at which point in the network an error was first logged, and using information relating to the topography of the network, a method of the invention identifies specific link segments that are likely to have undergone a fault.

Errors can occur, for instance, in commands, in data packets, and in responses, and may be due to faults in host bus adapters (HBAs), switches, cables such as fibre optic cables, and target devices on the network, such as disk arrays or tape storage devices on a storage area network (SAN). The present invention isolates faults in network link segments in all of these cases.

BRIEF DESCRIPTION OF THE DRAWINGS

FIG. 5 is a flow chart illustrating a method according to the invention for isolating fault regions, links or components in a storage area network.

DESCRIPTION OF THE PREFERRED EMBODIMENTS

Figure 1:
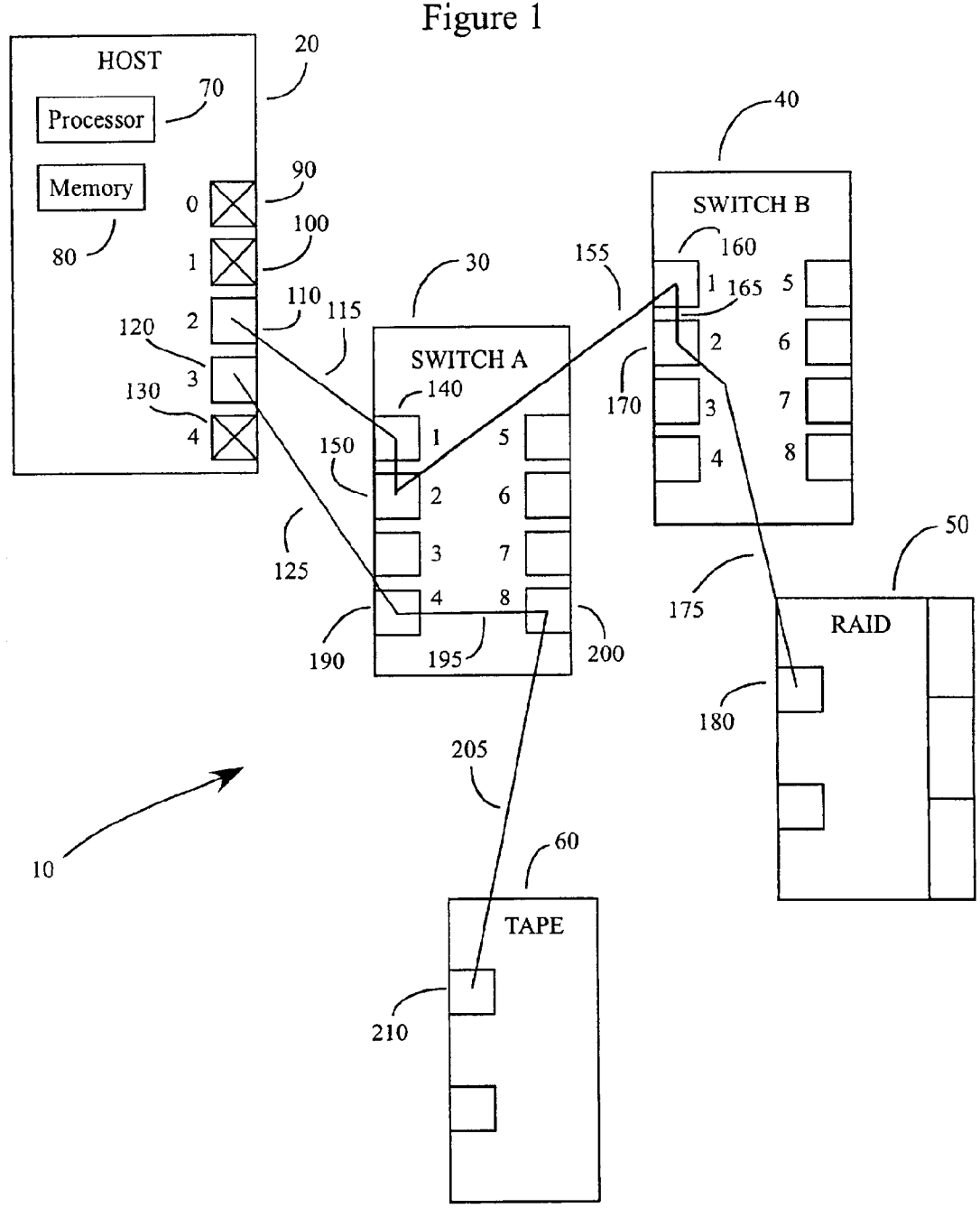
FIG. 1 is a block diagram depicting a storage area network including a host, a RAID array, and a tape storage device.

FIG. 1 is a block diagram of a storage area network (SAN) 10 including a host 20, two switches 30 and 40, a RAID array 50 (including disk stacks 52–56), and a tape storage device 60. This SAN 10 is an example for illustration of features of the present invention, and in a typical setting may include hundreds or thousands of devices and links, including multiple hosts, storage devices of various types, switches, and any other components that may be coupled or in communication with a SAN.

The host 20 may be in most respects a conventional processor-based system, such as a workstation, server or other computer, and includes at least one processor 70 executing instructions or program modules stored in memory 80. It will be understood that other components conventionally used in a processor-based system will be used, though not shown in FIG. 1, such as input-output (I/O) components and logic, disk or other storage, networking components and logic, user interface components and logic, and so on.

The present invention is described in the setting of a SAN, and reference is made to fibre channel (FC) network settings. However, the SAN 10 may be any appropriate network for which fault isolation according to the invention is desired, and in particular such a network need not involve storage at all, but may be a different type or more general network.

For the purposes of the present application, the term "logic" may refer to hardware, software, firmware or any combination of these, as appropriate for a given function. Similarly, a "program module" or a program may be a software application or portion of an application, applets, data or logic (as defined above), again as appropriate for the desired functions. Program modules are typically stored on hard disk or other storage medium and loaded into memory for execution.

Any of the method steps described herein can be appropriately carried out by logic as defined above including in part one or more applications; for instance, they may be executed by appropriate program modules stored in memory of a processor-based system, or in any other storage device or on a suitable medium, and executed on the host or any other suitable processor-based system. Thus, each step of the flow charts of FIGS. 4 and 5, or any combination thereof, may be implemented and executed in any conventional fashion relating to processor-based execution of method steps.

The error data may be stored at the host 20 or in some other storage device or medium connected to the network. In general, any device (including any storage medium) for storing data, such as disks, tapes, RAM or other volatile or nonvolatile memory may be used.

The switches discussed in the present application may be routers in a typical SAN configuration, or they may be other types of devices such as repeaters that forward commands and data from one device to another. The exact nature of the switches or repeaters is not crucial to the invention.

The host 20 includes or communicates by means of host bus adapters (HBA) 90–130 (marked 0–4), which control packets (commands, data, responses, idle packets, etc.) transmitted over the network 10. In the example of FIG. 1, HBA 110 is coupled via a cable or other connector (e.g. a fibre optic cable) over a link segment 115 to a port 140 of switch 30. Switch 30 includes other ports 2 (marked 150) through 8.

Port 140 is referred to as an "iport" (for "initiator port"), because it is the first port connected to the HBA 110, and acts as a receiver module for commands (such as read and write commands) and data (e.g. write data) transmitted from the HBA 100 to the switch 30. Port 140 is coupled via a link segment 145 to port 150 (marked 2) of switch 30. Port 150 acts as a transmitter module to forward commands and write data over link segment 155 to the switch 40.

Similarly, switch 40 includes ports marked 1–8, with port 1 marked with reference numeral 160 and port 2 marked with reference numeral 170. Port 160 acts as a receiver module for commands and data transmitted from port 150 of switch 30, and it forwards these commands and data via link segment 165 to port 170 for further transmission over link segment 175 to port 180 of RAID device 50.

Because port 170 is connected to a target device (i.e. the RAID device 50), it is referred to as a device port or "dport". Ports such as ports 150 and 160 that are connected from one switch to another are referred to herein as ISL (interswitch link) ports.

Where two components or devices on the network are coupled or in communication with one another, they may be said to be adjacent or directly connected with one another if there is no intervening switch, target or other device that includes the error count incrementation function. There may in fact be many other components or devices between two "adjacent" or "directly connected" components, but if such intervening components do not execute functions relating to error incrementation and/or fault isolation as described herein, they may be ignored for the purposes of the present invention.

The HBA 120 is coupled via link segment 125 to port 4 (marked 190) of switch 30, which acts as an iport and is itself coupled via link segment 195 to port 8 (marked 200) of switch 30. Similarly to ports 140 and 150, for commands and write data transmitted from the host 20 port 190 acts as a receiver module, and port 200 acts as a transmitter to forward these commands and data via link segment 205 to a port 210 of the tape storage device 60.

In the example of FIG. 1, only two ports of the host 20 are shown as active or connected. Ports 90, 100 and 130, and other ports as desired (not separately shown), are available for additional network connections.

In typical operation, the host 20 sends numerous read and write commands to the RAID device 50, the tape storage device 60, and many other devices on the network 10. Command packets are sent from the host 20 to the target device, and in the case of a write command, write data packets are also transmitted. The target device sends responses to the commands, and in the case of read commands will send read data packets back to the host.

The transmission of these packets is subject to any faults that may occur along the link segments that they must traverse. In the case of catastrophic failure of a link segment or other component, packets will simply not get through that fault region. More typical is that a component will undergo transient failures, such that only a small subset of the transmitted packets is corrupted. These transient failures are particularly difficult to isolate (or locate), because by their very transient nature they are difficult to reproduce, and the information that can be collected about them is minimal.

Transient errors are most likely to occur during transmission of read data and write data, simply because typically the number of packets of read and write data transmitted is far greater than the number of packets containing command or response data. However, the present invention is applicable no matter in which type of packets errors may occur.

Figure 2:
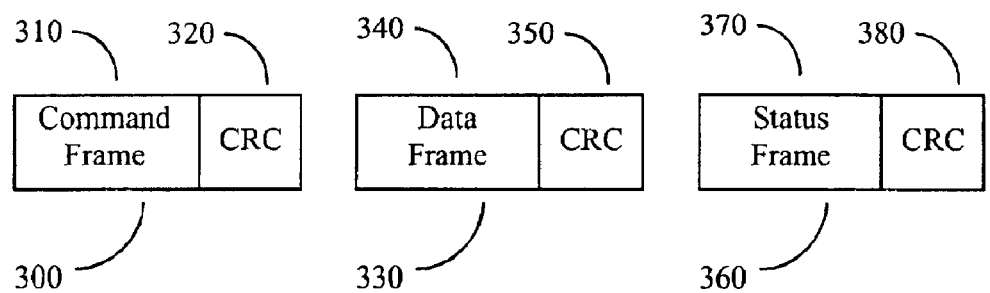
FIG. 2 shows data structures or packets usable in a storage area network as shown in FIG. 1.

As shown in FIG. 2, each data packet will typically include at least a frame with associated cyclic redundancy check (CRC) information, used to detect errors in a given packet. Thus, a command packet 300 includes a command frame 310 and CRC data 320; a data packet 330 includes a data frame 340 and CRC data 350; and a status frame (or packet) 360 includes status frame 370 and CRC data 380. "Frame" and "packet" may be used interchangeably for purposes of the present invention.

Thus, if there is a failure in the network, such as somewhere along link segments 115, 145, 155, 175, 125, 195 and/or 205, then packets passing through the failure region or problematic link segment may not be transmitted correctly. The errors in the packets will show up as CRC errors.

Figure 3:
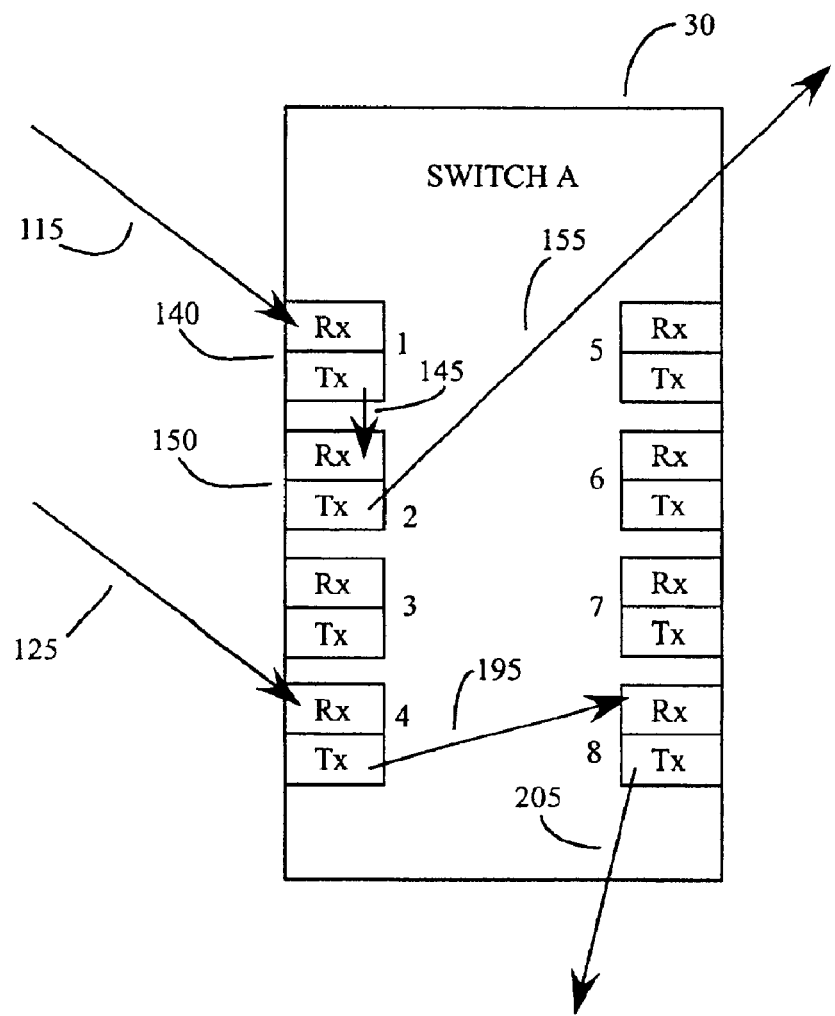
FIG. 3 is an enlarged view of the switch 30 shown in FIG. 1.

FIG. 3 shows in greater detail the structure of the switch 30. Each port 1–8 has logic or circuitry needed both to receive and transmit command packets, data packets and response packets. Thus port 140 may be regarded as including both a receive module Rx and a transmit module Tx, and for commands or write data incoming over link segment 115, port 140 acts as a receiver. These commands and data are forwarded from port 150, via its transmit module Tx, over link segment 155, and similar actions are carried out for all types of packets in each port. Thus, a given port may act as a receiver for some packets and as a transmitter for other packets. For instance, port 140 acts as a receiver for read and write commands and write data packets from the host 20, while it acts as a transmitter for response packets and read data packets coming "upstream" via link segments 155 and 145.

Port 150, by way of contrast, can act as a transmitter for read and write commands and write data packets from the host 20, while it acts as a receiver for response packets and read data packets coming "upstream" via link segments 155 and 145.

Figure 4:
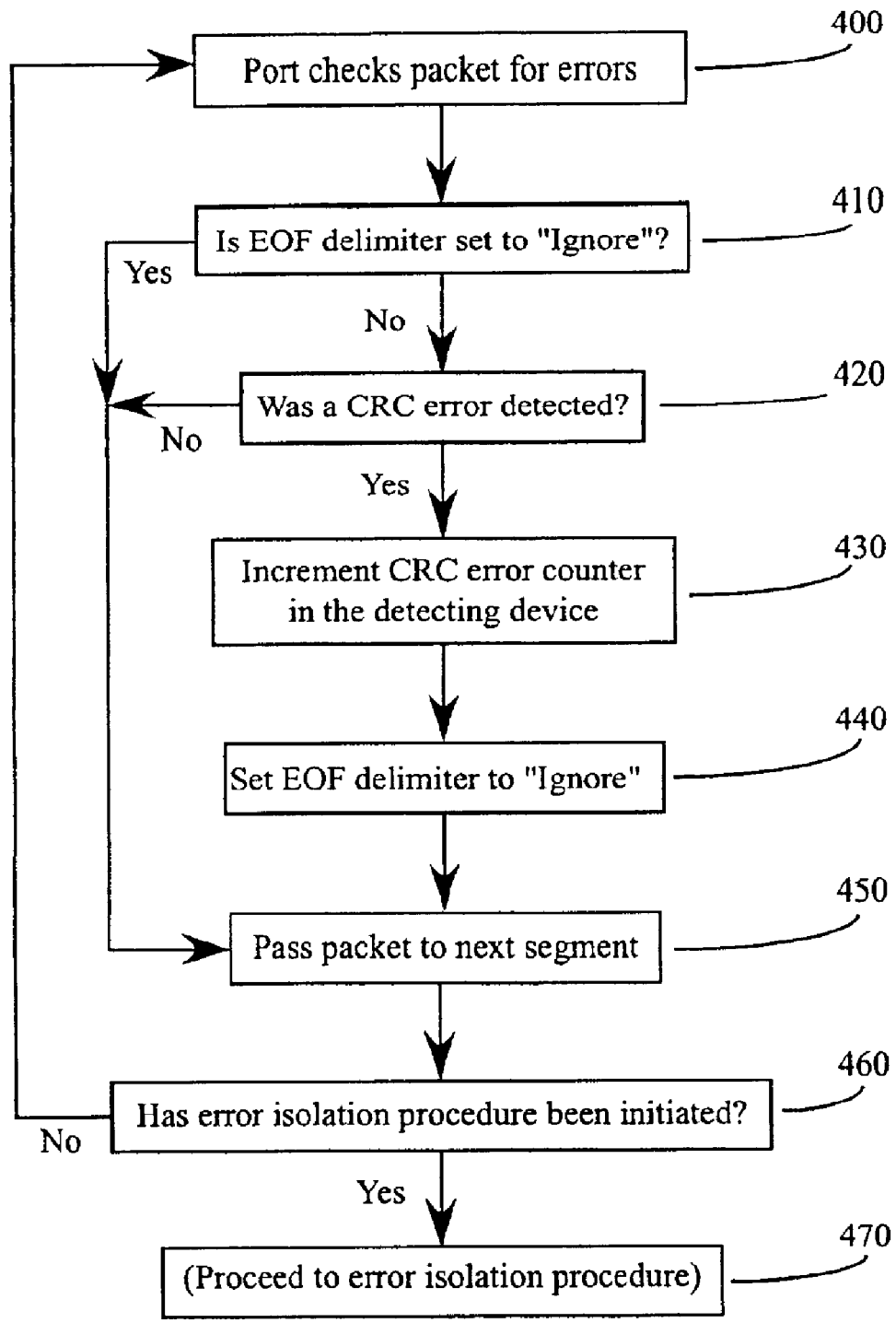
FIG. 4 is a flow chart illustrating a method according to the invention for treating errors that occur in a storage area network.

The flow chart of FIG. 4 illustrates a method according to the invention for logging (i.e. detecting and recording) errors in transmitted packets. In one embodiment of the invention, only the receivers inspect packets for errors, such as CRC errors. However, other components may be configured to inspect for errors as desired.

Thus, when a port receives a packet, as shown in box (or step) 400 of FIG. 4, it checks the CRC information. The receiving port includes logic to check the EOF (end-of-file) delimiter in the packet. The EOF delimiter includes a field (one or more bits) that can be set to a value indicating "Ignore", i.e. that any component receiving a packet with "Ignore" set should not use the information contained in that packet.

At box 410, the receiving port checks the EOF delimiter for the "Ignore" value. If it is found, then the packet is passed on without logging any CRC error information. However, if it is a good packet (the "Ignore" value is not present), then at box 420 the receiver inspects the packet for a possible CRC error.

If no CRC error is detected (box 420), the packet is passed to the next link segment or other component (box 450). However, if an error is detected, then the receiver increments its CRC error counter (box 430), and sets the EOF (end-of-file) delimiter in the packet to "Ignore". The packet is then sent to the next segment (box 450).

An error isolation case may be automatic, and for instance may be initiated whenever predetermined threshold criteria are met, such as an error count exceeding a certain number for a given region or component(s) of the network, or when an error count exceeds a given number in a predefined period of time. Many different types of criteria for such thresholds can be used, in general all relating to the detection of errors in the network as reflected by whether packets are transmitted successfully. Error isolation may also be initiated in an ad hoc fashion by a command from a user.

If an error isolation operation has been initiated (box 460), the method of FIG. 4 proceeds to box 470, and then to the case illustrated in the flow chart of FIG. 5.

Cases for Determining Locations of Errors

The following definitions of specific error cases incorporate an embodiment of the invention suitable for isolating faults in a fibre-channel-based SAN, or in any other type of network where errors in packets can be logged. FIG. 5 reflects these cases in flow chart form, and the cases are best understood in conjunction with the description below of the FIG. 5 flow chart.

These cases can use one of the error counters that is part of the Link Error Status Block (LESB) that can be extracted from each FC node attached to an FC loop using the Read Link Error Status Block (RLS) command. This command is part of Extended Link Services (ELS). ELS provide a set of protocol-independent FC functions that can be used by a port to perform a specified function or service at another port. The RLS command is used to request the current contents of the link error status block (LESB) associated with the destination N Port ID. These error counters can assist in determining the condition of the link for maintenance purposes.

The cases discussed below refer to the CRC error counter only, for the purposes of the present embodiment, though as indicated above other error information may be used. The cases may apply to single transient errors, which can greatly assist in isolating FC transient recoverable error conditions.

When referring to the "first" or "last" devices in a loop segment, or when referring to multiple devices on an FC loop, switches and HBAs are not to be considered as devices only for the purposes of these cases (and FIG. 5). In all other cases in this application, "devices" should be read in the broadest sense. Switches and HBAs are of course "devices" on the FC loop (as discussed elsewhere in this application), but for the limited purpose mentioned (see FIG. 5 at boxes 540–550, 570–580 and 610–620, discussed below), i.e. consideration of whether there are multiple (or just single) devices, or whether a device is the first or last in a given loop segment, then HBAs and switches should not be considered.

Case 1: An Iport CRC Error has been Detected in a Switch

This error can occur when transferring the command or the data from the host to the target device. This will most likely occur while writing (outputting) to the target device.

When an iport CRC error counter increments, the defective part of the link is identified as the point-to-point connection that is attached to this port. This link segment is the point-to-point connection between an HBA port and the iport of the switch, and the defect will be on the host side of the switch.

Case 2: An ISL Port CRC Error has been Detected in a Switch

This error can occur when transferring command, data, or status to or from the target device. ISL port CRC errors can occur when writing or reading.

When an ISL switch port CRC error counter increments, the defective part of the link is identified as the point-to-point connection that is attached to this port. This link segment is the point-to-point connection between the detecting switch ISL port and another switch ISL port, i.e. the point-to-point connection between two switches.

Case 3: A CRC Error has been Detected in a Single-Target Device

This case applies to devices that do not include multiple devices themselves. For instance, it would apply to a tape storage device such as device 60 in FIG. 1, but not to the RAID array 50 or to JBOD (Just a Bunch Of Disks) devices.

This error can occur when transferring the command or the data from the host to the target device. This will most likely occur while writing data to the target device.

If the target device is one of multiple devices on the same loop segment, then Case 4 is used.

When a single target device CRC error counter increments, the defective part of the link is identified as the point-to-point connection that is attached to this device. This link segment will either be the point-to-point connection between an HBA port and the detecting target device (where the target device is directly attached to the host), or it will be the connection between the switch dport and the detecting target device (where the target device is attached to host via a switch).

Case 4: An Error has been Detected by a Target Device, Which is one of Multiple Devices (e.g. within a Raid Array or JBOD) and is also the First Device on the Same Loop Segment Which device is the "first" device in an array of disks may depend on which interface is used to access the device during the failure. If a first interface is used, the first device may be the front drive 52 shown in FIG. 1. If a different interface is used, the first device may be the rear drive 56. (In general, the procedure for determining device order in a loop may be device-dependent, and can be determined, for instance, by referring to the documentation for a given multiple-device array or system.)

This error can occur when transferring the command or the data from the host to the target device. This will most likely occur while writing to the target device.

If the target device is not the first device on the same FC loop segment, Case 5 will be used.

When the target device is the first device on the FC loop segment and this device CRC error counter increments, the defective part of the link is identified as the point-to-point connection that is attached to this device. This link segment will either be the point-to-point connection between an HBA port and the target device (if the target is directly attached to the host), or the connection between the switch dport and the target device (if target device is attached to host via a switch).

Case 5: An Error has been Detected by a Target Device, which is one of Multiple Devices (e.g. within a Raid Array or JBOD) and is also not the First Device on the Same Loop Segment This error can occur when transferring a command or data from the host to the target device. This will most likely occur while writing to the target device.

When a target device CRC error counter increments, and this device is not the first device on the FC loop segment, the defect is somewhere on the host side of this device (prior to the detecting device). If a switch is physically connected between the HBA and this target device (i.e. the device is attached the host via a switch), the defective link segments that are suspect include all the connections and/or devices (in the broad sense, i.e. components of any type) between the connecting switch dport and the detecting target device.

If no switch is connected (i.e. the device is directly attached to the host), the defective link segments that are suspect are all the connections and or devices (in the broad sense) between the host HBA port and the detecting target device. This case thus isolates a fault to multiple suspect link segments (more than one). For this reason, in this case more failure data is required to isolate to a single defective link segment.

Case 6: An Error has been Detected in a Dport of a Switch, and the Target Device is a Single-Target Device or is the Last Device on the Loop Segment Similarly to the case of a first device as discussed under Case 4 above, the last device in a RAID array or JBOD (or other multiple-target device) depends on which interface is used on the (failing) command.

This error can occur when transferring the status or the data from the device to the host. This will most likely occur while reading from the target device.

If an error has been detected by the dport of a switch, and the target device is one of multiple devices on the same loop (link) segment, but the target device is not the last device on the loop, Case 7 will be used.

When a dport CRC error counter increments and the target device is the only or is the last device on the FC loop segment, the defective part of the link is identified as the point-to-point connection that is attached to this dport. This link segment is the point-to-point connection between this switch dport and the target device.

Case 7: An Error has been Detected in a Dport of a Switch, and the Target Device is one of Multiple Devices on the Same FC Loop, and the Target Device is not the Last Device on the Loop This error can occur when transferring status packets or data packets from the device to the host. This will most likely occur while reading from the target device.

When a switch's dport CRC error counter increments, and the target device is not the last device on the loop (where there are multiple devices), the defect is somewhere on the device side of the switch. The suspect defective link segments include all connections and devices (in the broad sense) between the switch dport and the addressed target device. This case thus isolates a fault to multiple suspect link segments (more than one). For this reason, in this case more failure data is required to isolate to a single defective link segment.

Case 8: An Error has been Detected by an HBA Port, and the Target Device is Directly Attached to Host (i.e. no Intervening Switches, and the Target Device is the Only or Last Device on the Loop Segment As above, the last device in a multiple-device target depends on which interface is used on the failing command.

This error can occur when transferring status or data packets from the device to the host. This will most likely occur while reading from the target device.

If an error has been detected in an HBA port and the target device is attached to the host via a switch, Case 9 will be used. If an error has been detected in an HBA port and the target device is directly attached to the HBA (i.e. without an intervening switch), but the target is not the last device on (multi-target) loop segment, then Case 10 will be used.

When an HBA port CRC error counter increments and the (directly attached) target device is the only or last device on the loop segment, the defective part of the link is identified as the point-to-point connection that is attached to this HBA port. This link segment is the point-to-point connection between this HBA port and the target device.

Case 9: An Error has been Detected in an HBA Port, and the Target Device Attached to the Host via a Switch This error can occur when transferring status or data packets from the device to the host. This will most likely occur while reading from the target device.

If an HBA port CRC error counter increments and the target device is attached to the host via a switch, the defective part of the link is identified as the point-to-point connection that is attached to this HBA port. This link segment is the point-to-point connection between this HBA port and the switch iport.

Case 10: An Error has been Detected at the HBA, and the (Directly Attached) Target Device is not the Last Device on a (Multiple-Target) Loop Segment This error can occur when transferring status or data packets from the device to the host. This is most likely to occur while reading from the target device.

When an HBA port CRC error counter increments and a directly attached target device is not the last device on the loop, the defect is somewhere on the device side of the HBA port. The suspect defective link segments include all connections and devices (in the broad sense) between the HBA port and the target device. Thus, this case isolates to multiple suspect link segments (more than one). For this reason, more failure data is required to isolate to only a single defective link segment.

The Method of FIG. 5.

A method suitable for implementing the above cases is illustrated in the flow chart of FIG. 5. The method in FIG. 5 will in general be traversed once per error under consideration, i.e. for each error the method begins at box 500 and ultimately returns to box 500. When all (or the desired number) of errors have been treated according to the method, then the method proceeds to box 740 for suitable storage, output or other handling of the fault isolation information.

At step (box) 500, it is considered whether there are errors whose failure regions (e.g. link segments) need to be identified. If so, at box 510 it is first considered whether a given error under consideration was detected at an iport. If this is the case, then the error link has been located (see box 640) as being between the detecting iport and the HBA.

This first example (of box 640) corresponds to Case 1 above (and link 115), and relates in particular to command errors or write data errors. The labeling of "R" or "W" in boxes 640–730 refers to the most likely sources of errors as read data errors or write data errors, respectively, and are not the only possibilities. For instance, read and write command errors and response errors are also possible at various points in the system. Generally read and write command errors will be detected at the same points that write data errors are detected (i.e. on the way "downstream" to a target), and response errors will be detected at the same points that read data errors are detected (i.e. on the way "upstream" to a host).

If the error was detected by an ISL (boxes 520 and 650), then the error link has been located as being between the detecting switch and the previous switch. This corresponds to Case 2 above (and link 155 in FIG. 1).

If the error was detected in a target device (box 530), then the method proceeds to box 540. If the target device is a single target, then (see box 660) the error link has been located as being between the target device and the previous device—namely, either the HBA or a switch that is between the HBA and the target device. This corresponds to Case 3 above (and link 205 in FIG. 1).

If at box 540 the target device is determined to be one of a plurality of devices in the target, and (box 550) the target device is determined to be the first device in this loop segment (see discussion of Case 4 above), then at box 670 the error has been located as being between the first device under consideration and the previous device (e.g. the HBA or an intervening switch). This corresponds to Case 4 above (and link 175 in FIG. 1).

If at box 540 the target device is determined to be one of a plurality of devices in the target, and (box 550) the target device is determined not to be the first device in this loop, then at box 680 it is determined that there are multiple suspect links, namely all connections or components of any type between the target device and the previous device. This corresponds to Case 5 above.

If at box 530 it was determined that the error was not in the target device, then the method proceeds to box 560 to determine whether the error was detected in a dport of a switch, and if so the method proceeds to box 570.

At box 570, if the target device where the error was detected is a single target as discussed above, or (box 580) the target includes multiple devices but the target device is the last in this loop segment, then at box 690 the error link has been located as being between the dport of the switch and the target device. This corresponds to Case 6 above (and links 175 and/or 205 in FIG. 1).

However, if at box 570 the target is determined not to be a single-device target and at box 580 it is also determined that the target device is not the last device on this loop segment, then at box 700 it is determined that there are multiple suspect links, namely all connections or components of any type between the dport of the switch and the target device. This corresponds to Case 7 above.

If at box 560 it is determined that the error was not detected in a dport of a switch, then the method proceeds to box 590. If the error was detected in the host (i.e. HBA), then the method proceeds to box 600. Note that if the error was not detected in the HBA of the host, then there may be other devices than those identified here that can detect and record errors. Such other devices can be used in alternative embodiments in conjunction with the present invention to assist the fault isolation cases.

If at box 600 it is determined that the target device was connected directly to the host (i.e. without intervening switches—though other intervening components may be present), then the method proceeds to step 610.

If, on the other hand, it is determined at box 600 that the target device is not connected directly to the HBA (i.e. there is at least one intervening switch), then the error link has been located as being between the HBA and the previous switch. This corresponds to Case 9 above (and link 125 in FIG. 1).

At box 610, if it determined that the (directly attached) target is a single target as described above, or if it is a multiple target and (box 620) the target device is the last device in this loop segment, then the error link has been located as being between the HBA and the target device (box 720). This corresponds to Case 8 above (and link 125 in FIG. 1).

Finally, if the (directly attached) target is not a single target (box 610) and is also not the last device (of multiple devices) in this loop segment, then there are multiple suspect links, namely all connections and components of any kind between the HBA port and the target device.

Using the above approach, error links can be definitely identified on a single error, and for those cases (Cases 5, 7 and 10) where multiple suspect links remain, the suspect fault regions can still be narrowed to only those links within multiple targets, again upon detection of a single error of the types discussed. A suitable system and method for specifically identifying which of the multiple suspect links is the actual faulty link can be found in applicant's copending application entitled "System and Method for Isolating Faults in a Network" by Wiley, et al., Ser. No. 10/172,302, filed on the same day as the present application and incorporated herein by reference.

What is claimed is:

1. A fault isolation system adapted for use in a computer network having a host in communication with a storage device configured to store information relating to a plurality of detected errors that occur in packets transmitted over the network, the system having a plurality of program modules configured to execute on at least one processor, the program modules including:

an error detection module configured to identify respective components within the network at which each of the plurality of detected errors occurs;

an error count module configured to increment an error count at each identified component where an error has occurred;

a packet ignore module configured to alter a given packet for which an error has been detected to indicate to components other than the identified component not to increment their error counts for the given packet; and a link segment identification module configured to identify at least one link segment coupled to each identified component at which an error count is incremented.

2. The system of claim 1, wherein:

a first incremented error count corresponds to a first switch on the network coupled to the host; and the identified link segment relating to the first incremented error count includes a link segment between the first switch and the host.

3. The system of claim 1, configured for use in a configuration of the network including a plurality of switches, wherein:

a first incremented error count corresponds to one of the plurality switches on the network; and the identified link segment relating to the first incremented error count includes a link segment between the one switch and a switch at an adjacent position on the network.

4. The system of claim 1, wherein:

a first incremented error count corresponds to an addressed, single-device target on the network; and the identified link segment relating to the first incremented error count includes a link segment between the addressed target and an adjacent component of the network.

5. The system of claim 1, wherein:

a first incremented error count corresponds to a write operation and corresponds to an addressed device of a multiple-device target on the network, where the addressed device is a first device in the target;

the identified link segment relating to the first incremented error count includes a link segment between the addressed device and a component of the network adjacent the multiple-device target.

6. The system of claim 1, wherein:

a first incremented error count corresponds to a write operation and corresponds to an addressed device of a multiple-device target on the network, where the addressed device is not a first device in the target;

the identified link segment relating to the first incremented error count includes at least one of a plurality of link segments between the addressed device and a component of the network adjacent the multiple-device target.

7. The system of claim 1, wherein:
a first incremented error count corresponds to a port of a switch adjacent an addressed, single-device target on the network; and
the identified link segment relating to the first incremented error count includes a link segment between the addressed target and the adjacent switch.

8. The system of claim 1, wherein:
a first incremented error count relates to a read operation from an addressed device of a multiple-device target on the network and corresponds to a port of a switch adjacent the multiple-device target, where the addressed device is a last device in the target; and
the identified link segment relating to the first incremented error count includes a link segment between the addressed device and the adjacent switch.

9. The system of claim 1, wherein:
a first incremented error count relates to a read operation from an addressed device of a multiple-device target on the network and corresponds to a port of a switch adjacent the multiple-device target, where the addressed device is not a last device in the target; and
the identified link segment relating to the first incremented error count includes at least one of a plurality of link segments between the addressed device and the adjacent switch.

10. The system of claim 1, wherein:
a first incremented error count corresponds to a component of the host; and
the identified link segment relating to the first incremented error count includes a link segment between the host and a component which is adjacent the host on the network.

11. The system of claim 10, wherein the adjacent component includes an addressed, single-device target for an operation relating to the first incremented error count.

12. The system of claim 10, wherein the adjacent component includes a switch on the network between the host and an addressed target for an operation relating to the first incremented error count.

13. The system of claim 1, wherein:
a first incremented error count corresponds to a component of the host and relates to a read operation of an addressed device which is a last device of a multiple-device target adjacent the host; and
the identified link segment relating to the first incremented error count includes a link segment between the host and the addressed device.

14. The system of claim 1, wherein:
a first incremented error count corresponds to a component of the host and relates to a read operation of an addressed device which is not a last device of a multiple-device target adjacent the host; and
the identified link segment relating to the first incremented error count includes at least one of a plurality of link segments between the addressed device and the host.

15. A method for identifying a fault region in a network having a host processor-based system in communication with at least one target device and a plurality of switches, including the steps of:
identifying at least one error relating to transmission of a packet on the network;
generating an error count relating to the identified error and corresponding to a first component at which the error was identified;
generating an indicator relating to the packet configured to inhibit other components from generating error counts relating to the identified error.

16. The method of claim 15, further including the steps of:
identifying a second component adjacent the first component on the network; and
identifying a link segment coupling the first and second components as the fault region.

17. The method of claim 15, further including the steps of:
identifying a multiple-device target as the first component; and
identifying at least one of a plurality of link segments between the multiple-device target and an adjacent second component as the fault region.

18. A computer program product stored on a computer-usable medium, comprising a computer-readable program configured to cause a computer to control execution of an application to identify a fault region associated with at least one of a plurality of detected errors in a network, the computer-readable program including:
an error identification module configured to identify at least one error relating to transmission of an error packet on the network;
an error count module configured to maintain an error count relating to at least one error identified at each of a plurality of components on the network;
a packet delimiter module configured to modify a packet for which an error is detected at a first component of the network to inhibit other components from generating error counts relating to the identified error; and
a fault region detection module configured to identify at least one link segment adjacent the first component as the fault region.

19. The computer program product of claim 18, wherein the first component of the network comprises a multiple-device component, and the fault region detection module is configured to identify the fault region as including a plurality of link segments of the multiple-device component.

20. A computer network, including:
a host including a processor and a host bus adapter;
error identification logic configured to identify at least one error relating to transmission of an error packet on the network;
error count logic configured to maintain an error count relating to at least one error identified at each of a plurality of components on the network;
packet delimiter logic configured to modify a packet for which an error is detected at a first component of the network to inhibit other components from generating error counts relating to the identified error; and
fault region detection logic configured to identify at least one link segment adjacent the first component as the fault region.

21. The computer network product of claim 20, wherein the first component of the network comprises a multiple-device component, and the fault region detection logic is configured to identify the fault region as including a plurality of link segments of the multiple-device component.

* * * * *